March 19, 1963  G. C. BRACKEN  3,082,287
FLEXIBLE CABLE COOLING MEANS FOR WELDING MACHINES
Filed Nov. 13, 1958  2 Sheets-Sheet 1

INVENTOR.
GARLAND C. BRACKEN
BY
ATTORNEY

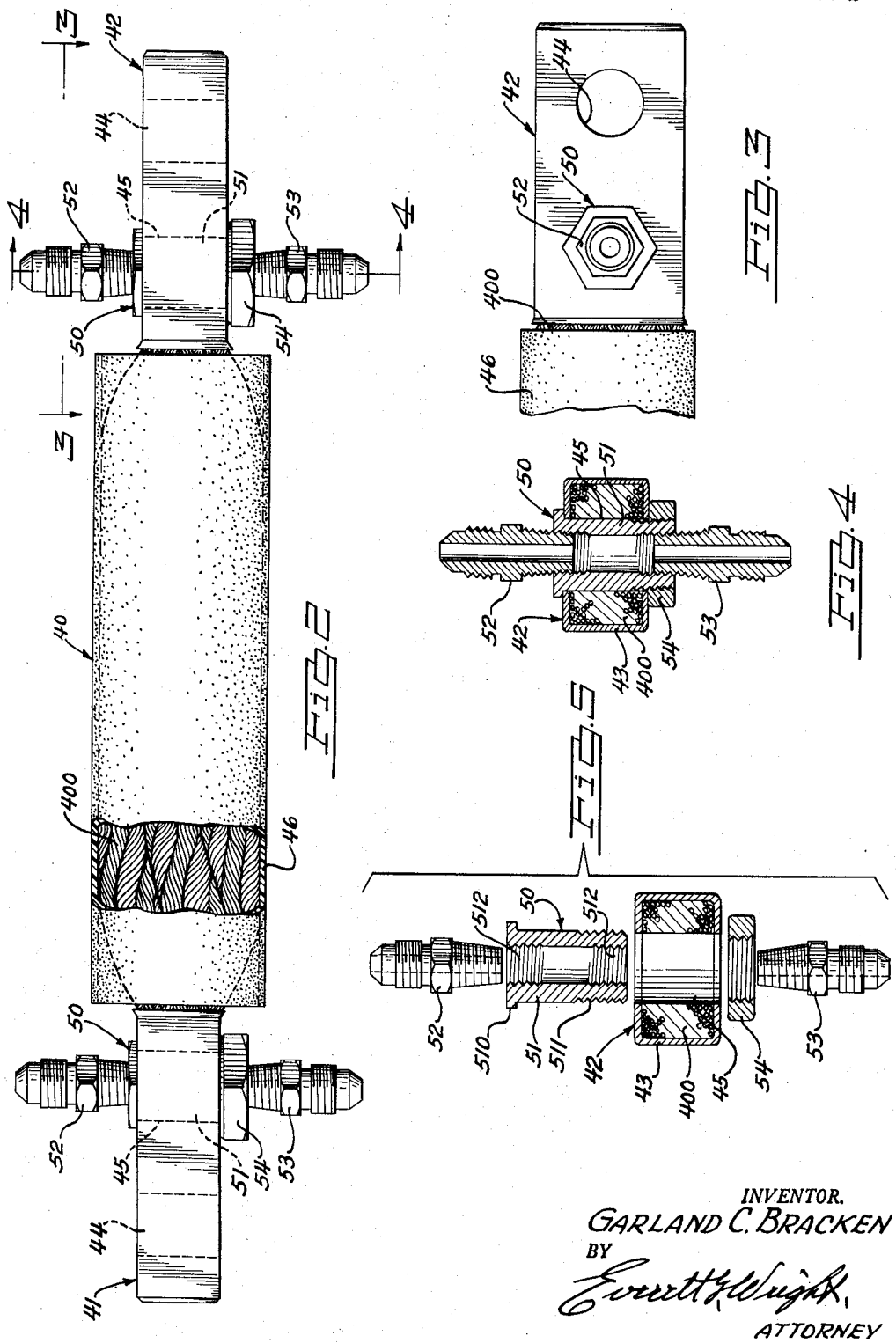

United States Patent Office 3,082,287
Patented Mar. 19, 1963

3,082,287
FLEXIBLE CABLE COOLING MEANS FOR
WELDING MACHINES
Garland C. Bracken, Dearborn, Mich., assignor to Dollar Electric Co., Madison Heights, Mich., a corporation of Michigan
Filed Nov. 13, 1958, Ser. No. 773,710
2 Claims. (Cl. 174—15)

This invention relates to means for preventing overheating of welding machines, and in particular to means for cooling dry type flexible cables such as woven wire or laminated flexible cables commonly employed between the secondary transformer lugs of a welding transformer and the welding electrode holders of welding machines.

Heretofore, high production welding machines employing conventional woven wire or laminated flexible secondary cables running from the secondary transformer lugs to the welding electrodes ofttimes required to be operated at a relatively slow operating cycle, or the welding machine had to be shut down at intervals to permit cooling of both the flexible cables and the transformer. This shut-down requirement was occasioned by heat from the welding operation overheating the flexible secondary cables which in turn conducted heat to the secondary lugs of the welding transformer causing overheating of the transformer. Many welding machine and transformer failures have been caused by overheating such as described above.

In the prior art, many attempts have been made to provide wet type flexible secondary cables for welding machines having coolant passing longitudinally through the center thereof; however, none have proven to be universally satisfactory inasmuch as such cables were not sufficiently flexible for continuous operation when connected to movable electrodes. Furthermore, because of their high original cost and relatively short life prior to leaking or failure, such so-called wet flexible cables are not generally used.

With the foregoing in view, the primary object of this invention is to provide, in a welding machine, a flexible cable for connecting a lug of the transformer secondary to the electrode holder of a movable electrode including means for cooling the said flexible cable whereby to prevent overheating of the said flexible cable and the transformer.

Another object of the invention is to provide an improved flexible welding machine cable consisting of a flexible conductor such as woven copper cable or laminated copper ribbon bound tightly together at the ends thereof within a sleeve forming a connecting lug at each end thereof, and including simple effective means at one or preferably both said connecting lugs for cooling the same whereby to prevent excessive heat transfer through the said flexible cable from the welding electrode to the transformer secondary, and thusly improve the operating characteristics of the welding machine with which the said improved flexible cable is employed.

Other objects of the invention will become apparent by reference to the following detailed description taken in connection with the accompanying drawings, in which:

FIG. 2 is an enlarged side elevational view of an improved water cooled flexible secondary cable embodying the invention.

FIG. 3 is a top plan view taken on the line 3—3 of FIG. 2 showing a preferred cooling cable lug embodying the invention.

FIG. 4 is a vertical sectional view taken on the line 4—4 of FIG. 2.

FIG. 5 is an exploded sectional view similar to FIG. 4 showing in detail the several elements of the improved cooling cable lug.

Figure 1:
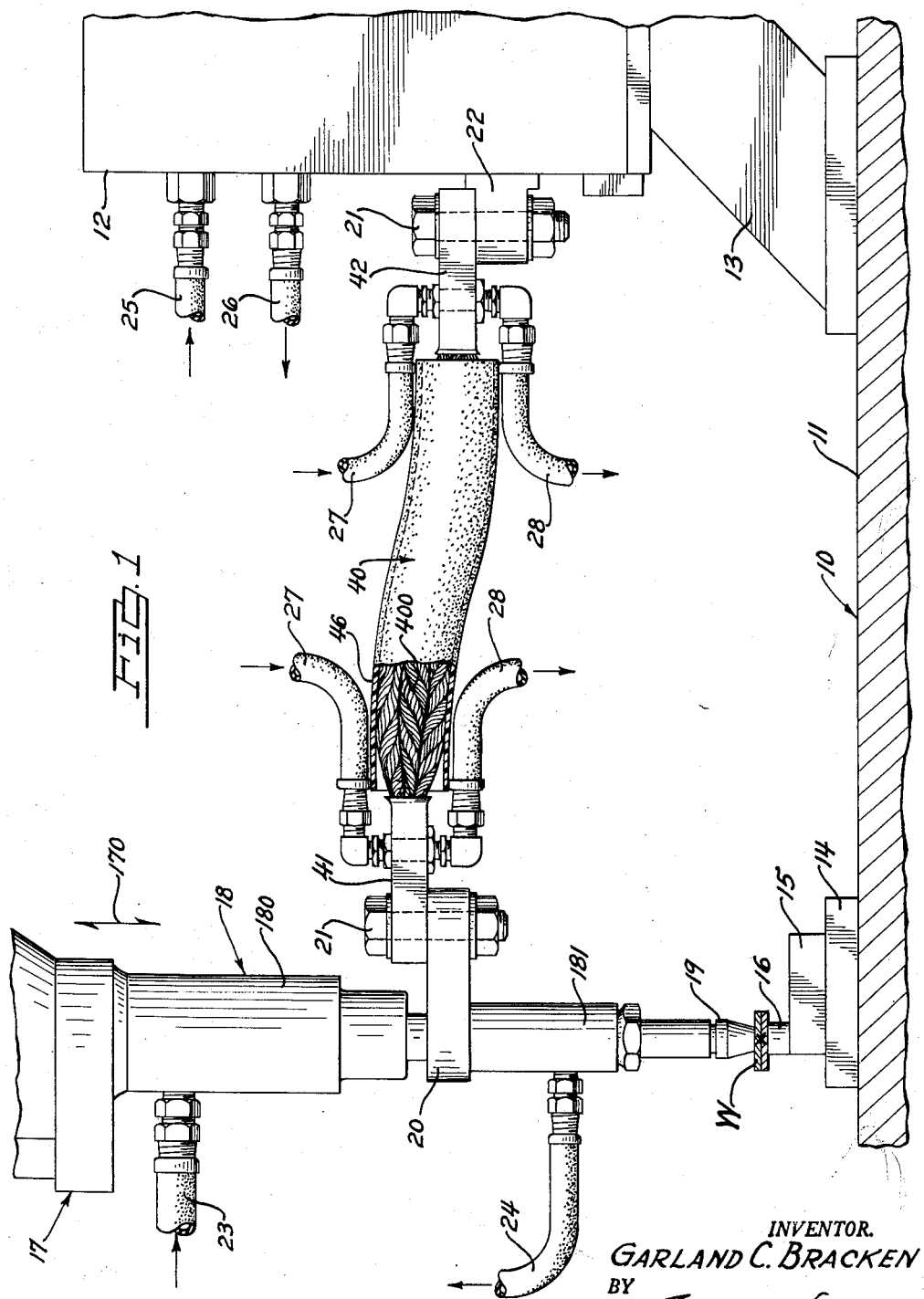
FIG. 1 is a fragmentary elevational view of a welding machine equipped with flexible cable cooling means embodying the invention.

Referring now to the drawings wherein like reference characters refer to like and corresponding parts throughout the several views, the particular embodiment of the invention disclosed for illustrative purposes is shown in FIG. 1 in connection with a typical conventional welding machine 10 including a base 11, a transformer 12 supported from the base 11 on a suitable bracket 13 which is generally grounded to one side of the secondary of the said transformer 12. Spaced from the said transformer 12 and fixed on the said base 11 are suitable electrode pads 14 and 15 onto which is mounted a fixed electrode 16 which may or may not be water-cooled. Above the said fixed electrode 16 is a welding machine head 17 adapted to move vertically as indicated by the arrow 170 to permit work W to be welded together to be placed onto the fixed electrode or anvil 16. The welding machine head 17 is preferably mounted on a fixed arm supported on the welding machine base 11 in any conventional manner, not shown.

Depending from the said vertically movable welding machine head 17 is a movable electrode holder 18 having an upper portion 180 preferably welded to the said welding machine head 17 and a lower portion 181 which receives and holds the movable electrode 19 therein. Fixed to the lower portion 181 of the electrode holder 18 is a lug 20 to which the lug 41 at one end of a flexible welding cable 40 embodying the invention is fixedly connected by a conventional lug bolt 21. The transformer 12 of the said welding machine 10 has a secondary lug 22 extending therefrom as shown in FIG. 1 to which the lug 42 at the other end of the flexible welding cable 40 embodying the invention is fixedly connected by a conventional lug bolt 21.

The movable electrode 19 is preferably water cooled by circulation of coolant to and through the upper and lower portion 180 and 181 of the movable electrode holder 18 via suitable flexible hoses 23 and 24 connected thereto. Likewise, the transformer 12 is preferably water cooled by circulation of coolant to and therethrough via suitable flexible hoses 25 and 26.

As hereinbefore indicated, if a conventional woven wire or laminated flexible secondary cable is used between the secondary transformer lug 22 and the electrode holder lug 20, excess heating of the electrode 19 and/or the said flexible cable travels through the electrode holder 18, through the said conventional secondary cable to the said secondary transformer lug 22 and into the said welding transformer 12, which increases the operating temperature of the said transformer 12 to above its safe operating temperature. It is this increase in operating temperature of the transformer 12 that requires a slowdown in the production cycle of a welding machine or intermittent stoppages in production to permit cooling of the welding transformer 12. It is recognized that the cooling of welding transformers over and above certain designed heating rates thereof is cumbersome and sufficiently expensive as to be uneconomical.

In FIGS. 2–5 inclusive is shown an illustrative embodiment of the improved flexible secondary cable 40 for welding machines 10 for use according to the invention between the secondary lug 22 of the transformer 12 and the lug 20 on the movable electrode holder 18 carrying the movable electrode 19, all for the purpose of properly controlling and minimizing heat transfer from the movable electrode 19 and the flexible cable 40 to the welding transformer 12.

The said flexible secondary cable 40 may be a cable having a plurality of woven wire strands 400, or it may be a laminated type cable constructed of a plurality of flat flexible conductors. A secondary cable 40 constructed of flexible multiple woven wire strands 400 will now be described.

The said flexible cable 40 is formed of a plurality of strands 400 of woven copper wire or other conductive material with its ends encased in rectangular lugs 41 and 42 in a manner to form the lug casing or sleeve 43 and the flexible stranded cable 400 into a substantial solid integral mass. A preferred method of forming lugs 41 and 42 on the ends of a flexible cable 40 consists of pulling the said cable 40 through suitably longitudinally spaced tubular steel sleeves 43 which are then circular or oval in cross section. The said sleeves 43 are then pressed under high pressure into the desired rectangular shape forming lugs 41 and 42 of the flexible cable 40 as shown in the drawings. This compacts the many strands of wire 400 in the flexible cable 40 into a substantially solid substantially integral mass within the said lugs 41 and 42. The excess cable is sheared off the outer ends of the said lugs 41 and 42 thereby producing a neatly finished appearance at the extreme ends of the said flexible cable 40. A suitable flexible rubber or plastic sheath 46 may be placed over the flexible cable 40 between the lugs 41 and 42 thereof.

The said lugs 41 and 42 of the flexible cable 40 are made somewhat longer than normal so that each will accommodate two vertically disposed longitudinally spaced apertures 44 and 45 therethrough. The outermost apertures 44 are the usual ones which accommodate the lug bolts 21 employed to fix the lugs 41 and 42 of the flexible cable 40 to the lug 20 of the movable electrode holder 18 and the lug 22 of the transformer secondary 12 respectively. The innermost apertures 45 each receive a cable cooling device 50 preferably as hereinafter described in detail.

The said cable cooling device 50 consists of a heat transfer sleeve 51 preferably of copper having a thin integral hexagonal head 510 at one end and an exteriorly threaded portion 511 at its opposite end. The said heat transfer sleeve 50 is of such an external diameter as to permit it to have a pressed fit into an aperture 45 through a cable lug 41 or 42, and is interiorly threaded at opposite ends at 512 to accommodate hose fittings 52 and 53. A clamp nut 54 is employed to securely fix a said heat transfer sleeve 51 to a cable lug 41 or 42 after it has been pressed into the aperture 45 therein. To assemble a cooling device 50 to a cable lug 41 or 42 of the flexible cable 40, a heat transfer sleeve 51 is first pressed tightly into the aperture 44 of one of said cable lugs with its exteriorly threaded portion 511 extending therefrom. A clamp nut 54 is then threaded onto the said heat transfer sleeve 51 and is drawn tightly against the cable lugs 41 or 42 whereby to firmly fix the said heat transfer sleeve 51 therein and thereto. Hose fittings 52 and 53 are then tightly threaded into upper and lower ends of the heat transfer sleeve 51, all as indicated in FIGS. 4 and 5.

Suitable flexible hoses 27 and 28 are connected to the hose fittings 52 and 53 of each of the cable lugs 41 and 42. Although the direction of flow of coolant to and from the movable electrode holder 18, to and from the transformer 12, and to and from the flexible cable 40 is indicated by arrows at each of the flexible hoses 23-28 inclusive, it is to be understood that any suitable flow of coolant may be employed according to the requirements of the particular design of the welding machine 10 and the arrangement of its one or more transformers 12 and welding heads 17.

Coolant flow through the movable electrode holder 18 and/or the movable electrode 19 is customary in resistance welding machines of the class illustrated. Also, the cooling of the transformer 12 is conventional. However, when such measures are employed to maintain proper operating temperatures of a welding machine, particularly its transformer, they are generally not sufficient under conditions of continuous operation of production type welding equipment. As hereinbefore mentioned, to design welding machines to withstand high temperatures and the overheating of the transformers thereof under conditions of continuous or rapid cyclic operation is economically unsound. However, the instant' invention provides simple, effective and inexpensive means for preventing transformer overheating in resistance welding machines which are used to perform high production welding operations.

Although a single embodiment of the invention and incorporation thereof in a particular illustrative type of a resistance welding machine has been disclosed and described in detail, it is obvious that many changes may be made in the size, shape, arrangement and detail of the various elements of the invention, all without departing from the spirit and scope thereof as defined by the appended claims.

I claim:

1. A flexible stranded cable cooling means for welding machine cables wherein the welding machine includes a transformer having a stationary secondary apertured lug and a closely located movable electrode having an apertured lug extending therefrom, a flexible stranded cable connecting said lugs, said flexible stranded cable including a metallic tubular sleeve at each end formed around the cable strands firmly encompassing the same forming a cable lug at each end of said cable, means connecting one of said cable lugs to each of said fixed and movable lugs of said transformer and said movable electrode, and a heat transfer sleeve means extending through at least one of the cable lugs and strands encompassed thereby normal to the longitudinal axis of said cable, and means connected to said heat transfer means for passing coolant therethrough.

2. A flexible stranded cable cooling means as claimed in claim 1 wherein the means for passing coolant through the cable lug comprises a metallic heat transfer sleeve means fixed through said cable lug including means for clamping said metallic heat transfer sleeve means in unitary heat transfer relationship to said cable lug, said clamping means being formed to accommodate coolant hose connectors.

References Cited in the file of this patent

UNITED STATES PATENTS

| | | |
|---|---|---|
| 1,292,716 | Cox | Jan. 28, 1919 |
| 1,884,370 | Chapman | Oct. 25, 1932 |
| 2,030,906 | Malley | Feb. 18, 1936 |
| 2,241,687 | Warnke | May 13, 1941 |
| 2,318,755 | Channell | May 11, 1943 |
| 2,433,588 | Wreford | Dec. 30, 1947 |
| 2,835,721 | Leathers | May 20, 1958 |
| 2,914,598 | Spillane | Nov. 24, 1959 |
| 3,041,408 | Wreford | June 26, 1962 |

FOREIGN PATENTS

| | | |
|---|---|---|
| 792,766 | Great Britain | Apr. 2, 1958 |